April 16, 1968     T. M. ROWE     3,377,717

DEVICE FOR TEACHING ADDITION AND SUBTRACTION

Filed July 27, 1966     2 Sheets-Sheet 1

INVENTOR.
THOMAS M. ROWE
BY
J. M. Carson, Jr.
ATTORNEY

April 16, 1968     T. M. ROWE     3,377,717
DEVICE FOR TEACHING ADDITION AND SUBTRACTION
Filed July 27, 1966     2 Sheets-Sheet 2
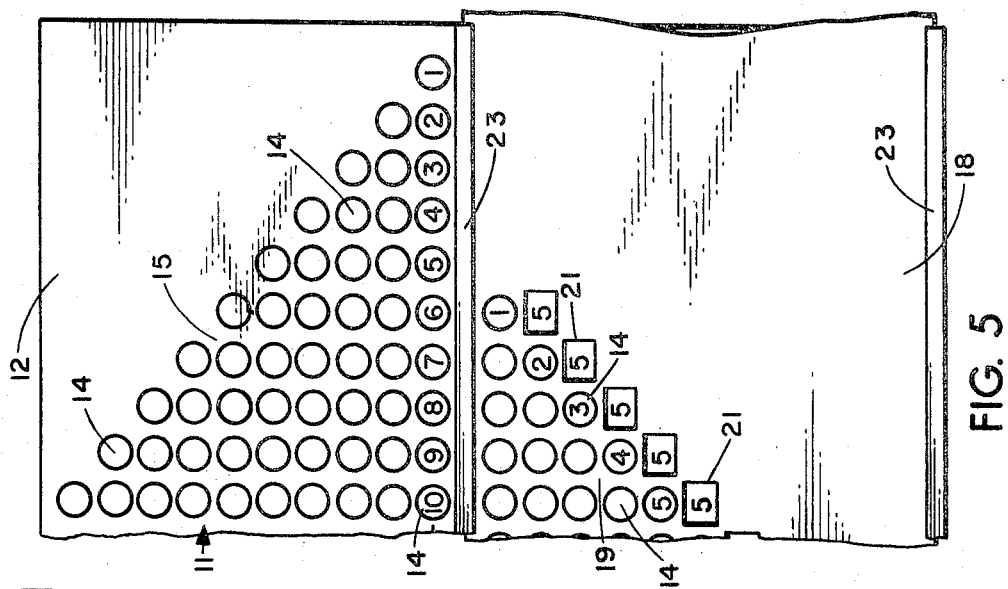
FIG. 5
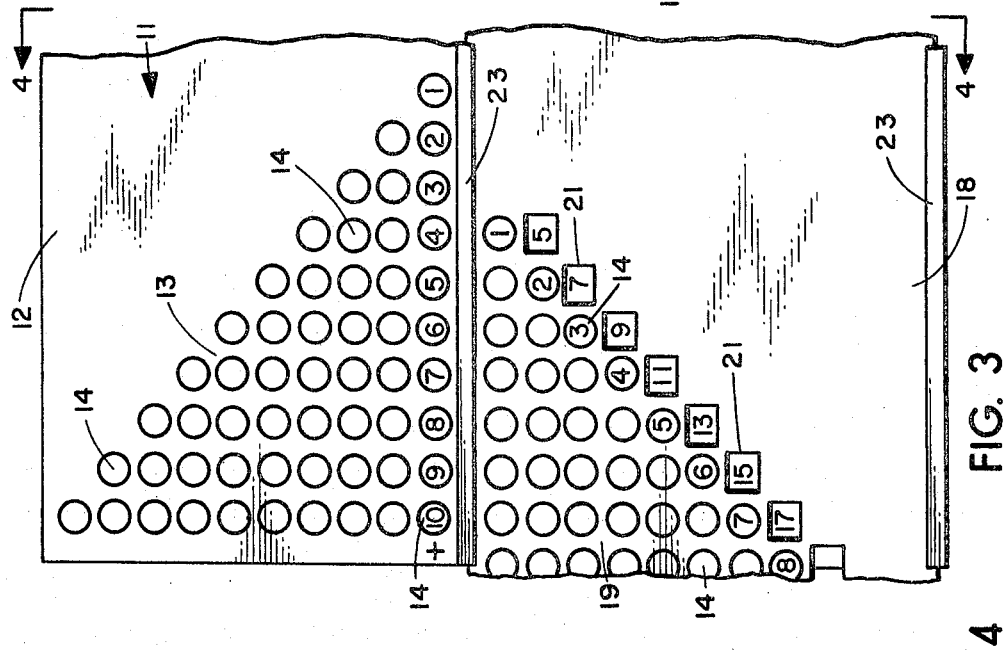
FIG. 3
FIG. 4
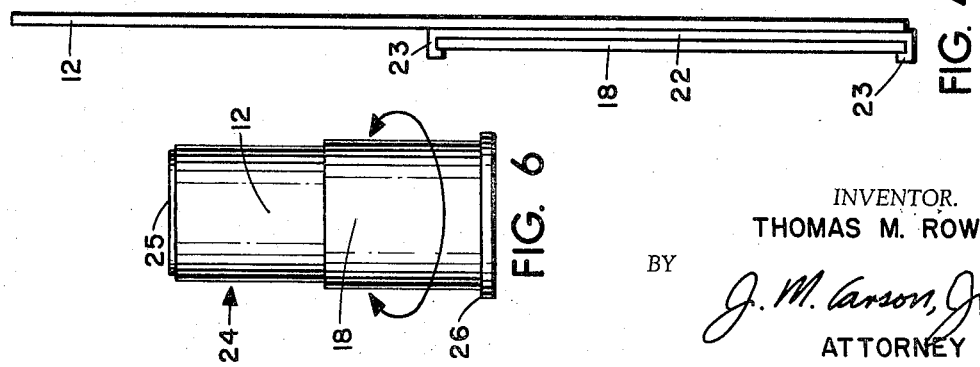
FIG. 6
INVENTOR.
THOMAS M. ROWE
BY
*J. M. Carson, Jr.*
ATTORNEY United States Patent Office 3,377,717
Patented Apr. 16, 1968

3,377,717
DEVICE FOR TEACHING ADDITION
AND SUBTRACTION
Thomas M. Rowe, 1412 Elm Ave.,
Portsmouth, Va. 23704
Filed July 27, 1966, Ser. No. 568,329
6 Claims. (Cl. 35—31)

This invention relates generally to a device for teaching arithmetic, and more particularly to a device for facilitating the teaching of addition and substraction to young children beginning the study of arithmetic in which the number of units involved in a particular problem is visually depicted as well as presented abstractly in the form of numerical indicia.

It has been found that young children beginning the study of arithmetic obtain a clearer concept of the subject at an earlier stage when instructional devices designed to display in concrete form the solution of certain numerical problems are utilized. One such prior art instructional device, disclosed in U.S. Patent No. 1,483,916 granted on Feb. 19, 1924, to N. Y. Troidl, among other features, includes the use of unit indicator objects moveable in grooves formed in a board carrying numerical and other indicia for illustarting certain problems in addition. Other somewhat more advanced, as well as more complex, devices designed to facilitate the teaching of arithmetic are shown in U.S. Patent No. 2,206,294 granted on July 2, 1940, to C. Stern, and in U.S. Patent No. 2,472,439 granted on June 7, 1949, to A. E. Rogers. While the devices shown in these prior art patents may function very well to obtain the results contemplated therein, the advantageous use thereof requires some previous knowledge of numbers and their values. The quite simple device forming the subject matter of the instant invention, however, is considered to overcome this drawback of the hereinbefore mentioned prior art in that any prior numerical instruction is not necessary before use may be made thereof.

Accordingly, an object of the present invention is the provision of a simple and inexpensive device for facilitating the teaching of arithmetic.

Another object of the instant invention is the provision of a simplified device for facilitating the teaching of numbers, addition, and subtraction.

A still further object of the present invention is the provision of an inexpensive and simplified device for facilitating the teaching of addition and subtraction in which the number of units, and the combinations of units, involved in a problem are visually depicted as well as set forth numerically.

According to the present invention, the foregoing and other objects are obtained by providing a device having a base sheet and an overlay sheet transversely moveable over a lower portion of the base sheet. An upper portion of the base sheet carries, in one desired location, an addition scale having a plurality of vertical columns of identical marks, each one of which may be aptly termed a "unity indicator." The number of unity indicators in each column thereof in the addition scale differs, preferably sequentially from adjoining column to adjoining column, from the number of unity indicators in the other columns, and the lowermost unity indicator in each column thereof, which are in horizontal alignment across the base sheet of the device, includes numerical indicia correlative with the number of unity indicators in the column. The upper portion of the base sheet also carries, in another desired location, a subtraction scale in horizontal alignment with the addition scale; the subtraction scale being identical with the addition scale. A lower portion of the base sheet carries an addition answer table disposed a selected distance below the addition scale, and also carries a subtraction answer table a like selected distance below the subtraction scale; the addition answer table and the subtraction answer table being in horizontal alignment across the base sheet. The overlay sheet of the device, when superposed on the lower portion of the base sheet thereof, has a lower edge coinciding with the lower edge of the base sheet and a parallelly disposed upper edge situated a small distance below the lowermost and numerical indicia including unity indicator in each column thereof carried by the base sheet in both the addition and subtraction scales. The overlay sheet carries, in a desired location, a master scale having a plurality of vertical columns of unity indicators; the uppermost unity indicator in each column thereof in the master scale being disposed a similar small distance below the upper edge of the overlay sheet and in horizontal alignment thereacross with the uppermost unity indicators in the other columns thereof in the master scale. The number of unity indicators in each column thereof in the master scale differs, preferably sequentially from adjoining column to adjoining column, from the number of unity indicators in the other columns, and the lowermost unity indicator in each column thereof in the master scale includes numerical indicia correlative with the number of unity indicators in the column. An aperture is formed through the overlay sheet a preselected distance below the lowermost unity indicator in each column thereof in the master scale. The overlay sheet may be moved transversely across the lower portion of the base sheet, as hereinbefore noted, to position any column of unity indicators of the master scale directly below any column of unity indicators of either the addition scale or the subtraction scale to set up a problem, and the solution to the problem, which appears numerically in the pertinent answer table on the base sheet immediately below the column of addition scale or subtraction scale unity indicators involved, may be read through the overlay sheet aperture situated below the column of master scale unity indicators involved.

A more complete appreciation of the invention and many of the attendant advantages thereof will be readily apparent as the same becomes better understood by reference to the following detailed description when considered in connection with the accompanying drawings wherein:

FIG. 3 is a partial front elevational view of the device showing a segment of the overlay sheet thereof superposed for transverse sliding movement on a segment of the lower portion of the base sheet thereof;

FIG. 4 is an end elevational view of the device as partially illustrated in FIG. 3, taken along the line 4—4 of FIG. 3;

FIG. 5 is a partial front elevational view of the device showing a segment of the overlay sheet thereof superposed for transverse sliding movement on another segment of the lower portion of the base sheet thereof; and FIG. 6 is a side elevational view of an alternative and preferred arrangement for superposing the overlay sheet of the device on the lower portion of the base sheet thereof for relative transverse movement therebetween.

Figure 1:
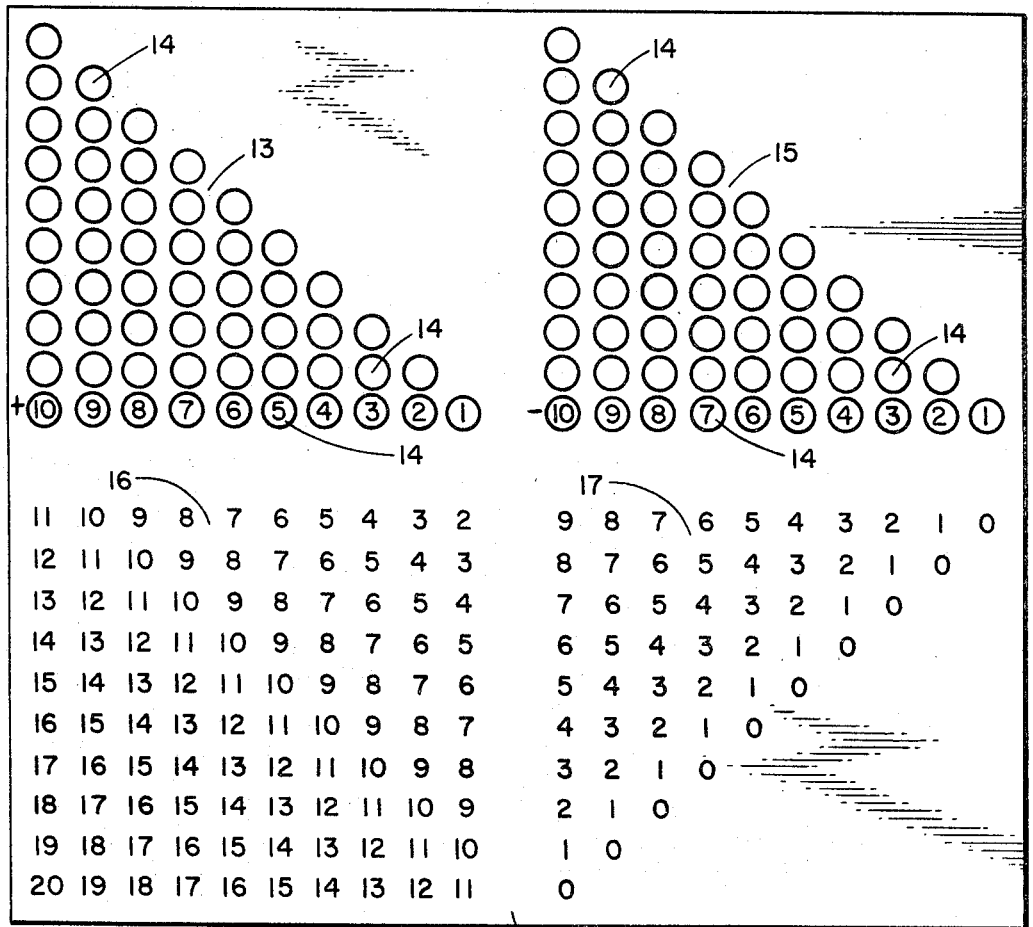
FIG. 1 is a front elevational view of the base sheet of the device.

Referring now more particularly to the drawings, wherein like reference numerals designate the same or identical parts throughout the several views, and more specifically to FIG. 1, there is shown a base sheet 12 of a device for facilitating the teaching of numbers, addition, and subtraction, generally designated by the reference numeral 11. The base sheet 12 of the device 11 is rectangular in planform and is composed of a relatively thin sheet of preferably opaque material having a surface upon which numbers and other indicia may be printed or otherwise placed. An upper portion of the base sheet 12 carries, in a desired location, an addition scale 13. The addition scale 13 includes a plurality of vertical columns of vertically and preferably equidistantly spaced identical marks 14, which may aptly be termed "unity indicators" as each is intended to represent a single unit, or unity; each unity indicator 14 being formed by a circle, as illustrated, or by any other suitable geometric figure. The addition scale 13 shown in FIG. 1 is constituted by ten columns of unity indicators 14; the column thereof at one side edge of addition scale 13 containing but one unity indicator 14. The number of unity indicators 14 in the remaining columns thereof in addition scale 13 increases sequentially by one from adjoining column to adjoining column; the number of unity indicators 14 in the column thereof at the other side edge of addition scale 13 reaching a total of ten. The lowermost unity indicator 14 in each column thereof in addition scale 13, which are all in horizontal alignment across the base sheet 12, includes numerical indicia correlative with the number of unity indicators 14 in the column. The addition scale 13, in addition to the use thereof in device 11 in the teaching of addition, as hereinafter set forth, may be utilized alone in the teaching of numbers. A young child examining the addition scale 13, perhaps with at least initial assistance from his teacher, may readily begin to associate, for example, the numeral "7" placed in the lowermost unity indicator 14 of one such column thereof with the seven identical marks making up the column, thereby increasing his knowledge of the values of numbers.

While ten columns of unity indicators 14 make up the addition scale 13 illustrated in FIG. 1, it is to be understood that a greater or smaller number of columns of unity indicators 14 may be employed therein, with a corresponding adjustment in the overall size of the device 11. Further, while it is considered highly desirable, in the interest of clarity, that the number of unity indicators 14 in each column thereof in addition scale 13 differ sequentially by one from adjoining column to adjoining column, it is not necessary that this preferred arrangement be strictly adhered to, so long as the device 11 is further rearranged in conformity therewith and in accordance with the principles hereinafter set forth.

The upper portion of the base sheet 12 of device 11 also carries, in another desired location, a subtraction scale 15. The subtraction scale 15 is identical to the addition scale 13, being made up of unity indicators 14 arranged exactly as in addition scale 13. The subtraction scale 15 is horizontally aligned across base sheet 12 with addition scale 13.

A lower portion of the base sheet 12 carries an addition answer table 16 disposed a preselected distance below addition scale 13. The addition answer table 16 includes a plurality of vertical columns of vertically and equidistantly spaced numbers; there being one such column of addition answer table numbers situated directly beneath each vertical column of unity indicators 14 in the addition scale 13. The uppermost number in each of the vertical columns thereof in addition answer table 16, which are in horizontal alignment across base sheet 12, is equal to the number of unity indicators 14 in the column thereof in addition scale 13 situated directly thereabove, plus one. Each succeeding number in each of the vertical columns thereof in addition answer table 16, proceeding downwardly, is equal to the value of the preceding number situated directly thereabove, plus one. Inasmuch as there are ten numbers in each vertical column thereof in addition answer table 16, the lowermost number in each such column is accordingly equal to the number of unity indicators 14 in the column thereof in addition scale 13 situated directly thereabove, plus ten.

The lower portion of the base sheet 12 also carries a subtraction answer table 17 disposed below subtraction scale 15. The subtraction answer table 17 also includes a plurality of vertical columns of vertically and equidistantly spaced numbers; there being one such column of subtraction answer table numbers situated directly beneath each vertical column of unity indicators 14 in the subtraction scale 15. The uppermost numbers in the vertical columns thereof in subtraction answer table 17 are also in horizontal alignment across base sheet 12, and are further in horizontal alignment across base sheet 12 with the uppermost number in each of the columns thereof in addition answer table 16. The equidistant vertical spacing of the numbers in subtraction answer table 17, further, is identical to the equidistant vertical spacing of the numbers in addition answer table 16. The uppermost number in each of the vertical columns thereof in subtraction answer table 17 is equal to the number of unity indicators 14 in the column thereof in subtraction scale 15 situated directly thereabove, less one. Each succeeding number in each of the vertical columns thereof in subtraction answer table 17, proceeding downwardly, is equal to the value of the preceding number situated directly thereabove, less one; the minimum and lowermost number in each column thereof in subtraction answer table 17 being zero, since it is not considered desirable to confuse young children by bringing in the concept of negative numbers at the stage of instruction in arithmetic for which the device 11 is intended.

Figure 2:
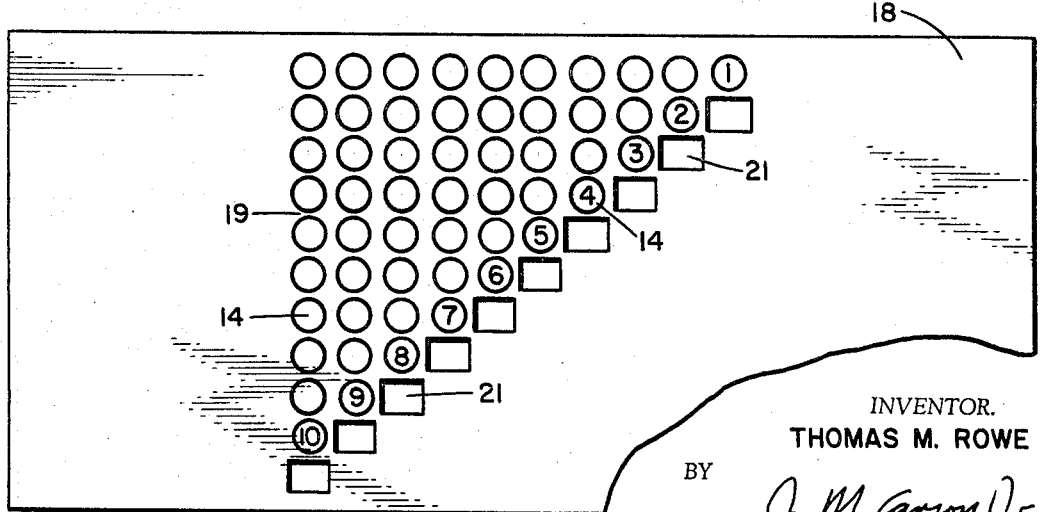
FIG. 2 is a front elevational view of the overlay sheet of the device.

The device 11 also includes an overlay sheet 18, as shown in FIG. 2. The overlay sheet 18 is rectangular in planform and, similarly to base sheet 12, is composed of a relatively thin sheet of preferably opaque material having a surface upon which numbers and other indicia may be printed or otherwise placed. The width of overlay sheet 18 may be just slightly greater than the width of base sheet 12, as indicated in the drawings, or may be of any other desired and adequate measure. The height of overlay sheet 18 is such that, when overlay sheet 18 is superimposed on the lower portion of base sheet 12 with the lower edges thereof coinciding, the upper edge of overlay sheet 18 is situated a small distance below the lowermost and numerical indicia including unity indicators 14 in each column thereof in both the addition scale 13 and the subtraction scale 15 carried by the base sheet 12.

The overlay sheet 18 carries, in a desired transverse location, a master scale 19. The master scale 19 includes a plurality of vertical columns of vertically and equidistantly spaced unity indicators 14 identical to the unity indicators 14 making up the addition scale 13 and the subtraction scale 15 carried by base sheet 12. The number of columns of unity indicators 14 in master scale 19 is equal to the number of columns of unity indicators 14 in addition scale 13 and subtraction scale 15; the column thereof at one side edge of master scale 19 containing but one unity indicator 14. The number of unity indicators 14 in the remaining columns thereof in master scale 19 increase sequentially by one from adjoining column to adjoining column; the number of unity indicators 14 in the column thereof at the other side edge of master scale 19 reaching a total of ten. The uppermost unity indicators 14 in the columns thereof in master scale 19 are in horizontal alignment across the overlay sheet 18, and the lowermost unity indicator 14 in each column thereof in master scale 19 includes numerical indicia correlatve with the number of unity indicators 14 in the column. The equidistant vertical spacing of the unity indicators 14 in each column thereof in master scale 19 is equal to the equidistant vertical spacing of the numbers in each column thereof in addition answer table 16 and subtraction answer table 17.

An aperture 21 is formed through overlay sheet 18 immediately beneath the lowermost and numerical indicia including unity indicator 14 in each column thereof in master scale 19; the vertical spacing between an aperture 21 and the unity indicator 14 situated directly thereabove being equal to the equidistant vertical spacing of the unity indicators 14 in each column thereof in master scale 19. The vertical location of master scale 19 on overlay sheet 18, further, is such that, when overlay sheet 18 is superposed on the lower portion of the base sheet 12 with the lower edges thereof coinciding, the uppermost aperture 21 of overlay sheet 18 is at the vertical level of the uppermost number in each column thereof in addition answer table 16 and in subtraction answer table 17. All of the other numbers in each column thereof in addition answer table 16 and subtraction answer table 17, accordingly, are also at the vertical level of an aperture 21 of overlay sheet 18 when overlay sheet 18 is superposed on the lower portion of base sheet 12 with the lower edges thereof in coincidence.

The device 11 forming the subject matter of the present invention is partially shown in FIG. 3 of the drawings, wherein the overlay sheet 18, with parts broken away, is superposed on the lower portion of the base sheet 12, also partially broken away. The lower edges of base sheet 12 and overlay sheet 18 are maintained at the same vertical level while the device 11 is in use, which may be accomplished manually as by standing base sheet 12 and overlay sheet 18 in contiguity on a flat level surface. Alternatively, however, device 11 may also incorporate means for maintaining the necessary relationship of the lower edges of base sheet 12 and overlay sheet 18, which may take the form, by way of exemplification, of a channel element 22 suitably secured to base sheet 12 in the position best seen in FIG. 4. The channel element 22 is provided with flanges 23 at the upper and lower extremities thereof adapted to embrace the upper and lower edges of the overlay sheet 18, as shown in FIGS. 3 and 4. The overlay sheet 18 and the channel element 22 are so proportioned that, while overlay sheet 18 is readily transversely moveable with respect to base sheet 12 within the confines of channel element 22, relative vertical movement between overlay sheet 18 and base sheet 12 will not occur.

The use of the device 11 in the teaching of addition is illustrated in FIG. 3 of the drawings. Suppose, for example, that a beginning arithmetic student, whose teacher is available to render any needed assistance or explanation, wishes to use device 11 to find the sum of six and three. The vertical column of six unity indicators 14 of addition scale 13, the lowermost of which includes the numeral "6," is first located. The overlay sheet 18 is then moved transversely with respect to base sheet 12 until the vertical column of three unity indicators 14 of master scale 19, the lowermost of which includes the numeral "3," is positioned directly beneath the pertinent column of unity indicators 14 of addition scale 13, as shown. The sum of six and three is then read numerically from addition answer table 16 through the aperture 21 of overlay sheet 18 situated directly beneath the vertically aligned columns of unity indicators 14 involved. A young child may thus discover that the numeral "6" represents six identical objects, that the numeral "3" represents three identical objects, and that the numeral "9" represents nine identical objects even when divided into related groups of six and three.

The related use of the device 11 in the solution of a problem in subtraction is illustrated in FIG. 5 of the drawings. Assuming, for example, that the problem involves finding the result of eight minus three, the vertical column of eight unity indicators 14 of subtraction scale 15, the lowermost of which includes the numeral "8," is first located. The overlay sheet 18 is then moved transversely with respect to base sheet 12 until the vertical column of three unity indicators 14 of master scale 19, the lowermost of which includes the numeral "3," is positioned directly beneath the pertinent column of unity indicators 14 of subtraction scale 15, as shown. The difference between eight and three is then read numerically from subtraction answer table 17 through the aperture 21 of overlay sheet 18 situated directly beneath the vertically aligned columns of unity indicators 14 involved.

The device generally designated by the reference numeral 24 shown somewhat schematically in FIG. 6 of the drawings represents an alternative and preferred arrangement for superposing the overlay sheet 18 hereinbefore described on the lower portion of the base sheet 12 hereinbefore described for relative transverse movement therebetween. Device 24 includes a cylindrical element 25 having a peripheral flange 26 extending horizontally outwardly therefrom at the lower extremity thereof; the circumference of cylindrical element 25 being substantially equal to the width of base sheet 12. Base sheet 12 is bent into cylindrical form and suitably secured to the cylindrical surface of element 25 with the lower edge of base sheet 12 in contact with the flange 26 and the vertical edges of base sheet 12 in mutual contact. Overlay sheet 18, which, as previously mentioned, is just slightly wider than base sheet 12, is also bent into cylindrical form and the vertical edges thereof mutually joined. The tubular cylindrical overlay sheet 18 is then somewhat loosely placed in sleeve fashion over the cylindrical base sheet 12, with the lower edge of overlay sheet 18 also in contact with the flange 26. The overlay sheet 18 of device 24 may be rotated about the base sheet 12 thereof as desired while the device 24 is held in the hand without fear of inadvertent relative vertical displacement of overlay sheet 18 and base sheet 12. It is to be understood that the outer cylindrical surfaces of base sheet 12 and overlay sheet 18 of device 24 carry all of the markings, numbers, and other features shown, respectively, in FIGS. 1 and 2; although the same have been omitted from FIG. 6 in the interest of clarity and due to the extreme reduction in scale thereof.

The number of unity indicators 14 in each column thereof in subtraction scale 15 and in master scale 19, like those of addition scale 13 as previously set forth, need not differ sequentially by one from adjoining column to adjoining column. While it is not considered likely that a haphazard arrangement of the columns of unity indicators 14 in addition scale 13, in subtraction scale 15, and in master scale 19 would ever be desired; yet, so long as the columns of numbers in addition answer table 16 and subtraction answer table 17 are rearranged to correspond to any rearrangement of the unity indicator columns of addition scale 13 and subtraction scale 15, and so long as the apertures 21 formed through overlay sheet 18 remain spaced immediately below the columns of unity indicators 14 of master scale 19 as hereinbefore set forth, such a haphazard arrangement could be followed.

If the devices 11 and 24 are desired solely for the teaching of numbers and addition, the subtraction scale 15 and the subtraction answer table 17 may be eliminated from the base sheet 12 thereof. Likewise, if the devices 11 and 24 are desired solely for the teaching of numbers and subtraction, the addition scale 13 and the addition answer table 16 may be eliminated from the base sheet 12 thereof.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for teaching arithmetic, comprising:
 (A) a base sheet having a horizontally disposed lower extremity and carrying
  (a) an addition scale including a plurality of vertical columns of vertically spaced identical unity indicator marks, the number of said unity indicator marks in each of the said columns thereof in said addition scale differing, with one of the said unity indicator marks in each of the said columns thereof in said addition scale including numerical indicia correlative with the number of said unity indicator marks in the column; as well as (b) an addition answer table disposed a distance below said addition scale, said addition answer table including a column of numbers situated directly beneath each of the said columns of unity indicator marks of said addition scale, the uppermost number in each of the columns thereof in said addition answer table being placed at the same vertical level on said base sheet and further being equal to the number of unity indicator marks in the column thereof in said addition scale situated directly thereabove plus one, the remaining numbers in each of the said columns thereof in said addition answer table being equal to the number situated directly thereabove plus one, the number greater by the same amount than the uppermost number in the column in each of the said columns thereof in said addition answer table being placed at the same vertical level on said base sheet; and (B) an overlay sheet having a horizontally disposed lower extremity superposed for transverse sliding movement at a constant vertical level on said base sheet, said overlay sheet having an upper extremity disposed below said addition scale carried by said base sheet, said overlay sheet having an aperture formed therethrough at the vertical level of each of the said numbers in the said columns thereof in said addition answer table carried by said base sheet, said apertures further being spaced across said overlay sheet, said overlay sheet further carrying a master scale including a plurality of vertical columns of vertically spaced identical unity indicator marks, the number of said master scale unity indicator marks in each of the said columns thereof differing, with one of the said master scale unity indicator marks in each of the said columns thereof in said master scale carrying numerical indicia correlative with the number of said master scale unity indicator marks in the column, each of the said columns of said master scale unity indicator marks being situated directly above one of said overlay sheet apertures, the number of said master scale unity indicator marks in the column thereof situated directly above an overlay sheet aperture being equal to the difference between the number in a column thereof in said addition answer table viewable through said aperture and the uppermost number in the said column thereof in said addition answer table.

2. The device according to claim 1, including a cylindrical element having a peripheral flange extending horizontally outwardly from the lower extremity thereof, said base sheet being bent into cylindrical form with said addition scale and said addition answer table on the outermost surface thereof, said cylindrical base sheet being secured to said cylindrical element with the lower extremity of said base sheet contacting said peripheral flange, said overlay sheet being bent into cylindrical form with said master scale on the outermost surface thereof and somewhat loosely placed around said base sheet with said lower extremity of said overlay sheet contacting said peripheral flange.

3. The device according to claim 1 wherein said base sheet further carries a subtraction scale disposed transversely across said base sheet from said addition scale, said subtraction scale being identical to said addition scale and being situated on said base sheet at the same vertical level as said addition scale, and wherein said base sheet also carries a subtraction answer table disposed a distance below said subtraction table a distance equal to the vertical distance between said addition scale and said addition answer table, said subtraction answer table including a column of numbers situated directly beneath each column of unity indicator marks of said subtraction scale, the uppermost number in each of the columns thereof in said subtraction answer table being placed at the same vertical level on said base sheet and further being equal to the number of unity indicator marks in the column thereof in said subtraction scale situated directly thereabove less one, the remaining numbers in each of the said columns thereof in said subtraction answer table being equal to the number situated directly thereabove less one, the number smaller by the same amount than the uppermost number in the column in each of the said columns thereof in said subtraction answer table being placed at the same vertical level on said base sheet, the vertical spacing of said subtraction answer table numbers corresponding to the vertical spacing of said addition answer table numbers.

4. The device according to claim 3, including a cylindrical element having a peripheral flange extending horizontally outwardly from the lower extremity thereof, said base sheet being bent into cylindrical form with said scales and said answer tables on the outermost surface thereof, said cylindrical base sheet being secured to said cylindrical element with the lower extremity of said base sheet contacting said peripheral flange, said overlay sheet being bent into cylindrical form with said master scale on the outermost surface thereof and somewhat loosely placed around said base sheet with said lower extremity of said overlay sheet contacting said peripheral flange.

5. A device for teaching arithmetic, comprising:

(A) a base sheet having a horizontally disposed lower extremity and carrying (a) a subtraction scale including a plurality of vertical columns of vertically spaced identical unity indicator marks, the number of said unity indicator marks in each of the said columns thereof in said subtraction scale differing, with one of the said unity indicator marks in each of the said columns thereof in said subtraction scale including numerical indicia correlative with the number of said unity indicator marks in the column; as well as (b) a subtraction answer table disposed a distance below said subtraction scale, said subtraction answer table including a column of numbers situated directly beneath each of the said columns of unity indicator marks of said subtraction scale, the uppermost number in each of the columns thereof in said subtraction answer table being placed at the same vertical level on said base sheet and further being equal to the number of unity indicator marks in the column thereof in said subtraction scale situated directly thereabove less one, the remaining numbers in each of the said columns thereof in said subtraction answer table being equal to the number situated directly thereabove less one, the number smaller by the same amount than the uppermost number in the column in each of the said columns thereof in said subtraction answer table being placed at the same vertical level on said base sheet; and (B) an overlay sheet having a horizontally disposed lower extremity superposed for transverse sliding movement at a constant vertical level on said base sheet, said overlay sheet having an upper extremity disposed below said subtraction scale carried by said base sheet, said overlay sheet having an aperture formed therethrough at the vertical level of each of the said numbers in the said columns thereof in said subtraction answer table carried by said base sheet, said apertures further being spaced across said overlay sheet, said overlay sheet further carrying a master scale including a plurality of vertical columns of vertically spaced identical unity indicator marks, the number of said master scale unity indicator marks in each of the said columns thereof differing, with one of the said master scale unity indicator marks in each of the said columns thereof in said master scale carrying numerical indicia correlative with the number of said master scale unity indicator marks in the column, each of the said columns of said master scale unity indicator marks being situated directly above one of said overlay sheet apertures, the number of said master scale unity indicator marks in the column thereof situated directly above each of said overlay sheet apertures being equal to the difference between the number in a column thereof in said subtraction answer table viewable through said aperture and the uppermost number in the said column thereof in said subtraction answer table.

6. The device according to claim 5, including a cylindrical element having a peripheral flange extending horizontally outwardly from the lower extremity thereof, said base sheet being bent into cylindrical form with said subtraction scale and said subtraction answer table on the outermost surface thereof, said cylindrical base sheet being secured to said cylindrical element with the lower extremity of said base sheet contacting said peripheral flange, said overlay sheet being bent into cylindrical form with said master scale on the outermost surface thereof and loosely placed around said base sheet with the lower extremity of said overlay sheet contacting said peripheral flange.

References Cited
UNITED STATES PATENTS

| | | | |
|---|---|---|---|
| 613,432 | 11/1898 | Szenhak | 235—87 |
| 2,950,542 | 8/1960 | Steelman | 35—31 |
| 3,339,295 | 9/1967 | Wanvig | 35—31 |

EUGENE R. CAPOZIO, *Primary Examiner.*

W. H. GRIEB, *Examiner.*